United States Patent
Lu

(10) Patent No.: US 12,236,027 B2
(45) Date of Patent: Feb. 25, 2025

(54) DEVICE FOR DETECTING FIXATION OF STYLUS AND INTELLIGENT INTERACTIVE BOARD

(71) Applicants: GUANGZHOU SHIYUAN ELECTRONICS CO., LTD., Guangzhou (CN); GUANGZHOU SHIRUI ELECTRONICS CO. LTD., Guangzhou (CN)

(72) Inventor: Yucheng Lu, Guangzhou (CN)

(73) Assignees: GUANGZHOU SHIYUAN ELECTRONICS CO., LTD., Guangzhou (CN); GUANGZHOU SHIRUI ELECTRONICS CO. LTD., Guangzhou (CN)

( * ) Notice: Subject to any disclaimer, the term of this patent is extended or adjusted under 35 U.S.C. 154(b) by 0 days.

(21) Appl. No.: 18/281,976

(22) PCT Filed: Apr. 20, 2022

(86) PCT No.: PCT/CN2022/087796
§ 371 (c)(1),
(2) Date: Sep. 14, 2023

(87) PCT Pub. No.: WO2022/233234
PCT Pub. Date: Nov. 10, 2022

(65) Prior Publication Data
US 2024/0176436 A1   May 30, 2024

(30) Foreign Application Priority Data
May 7, 2021 (CN) .......................... 202110496470.1

(51) Int. Cl.
*G06F 3/039* (2013.01)
*G06F 3/0354* (2013.01)
*G06F 3/041* (2006.01)

(52) U.S. Cl.
CPC .......... *G06F 3/039* (2013.01); *G06F 3/03545* (2013.01); *G06F 3/041* (2013.01)

(58) Field of Classification Search
CPC ..... G06F 3/03545–03546; G06F 3/039; G06F 2200/1632
See application file for complete search history.

(56) References Cited

U.S. PATENT DOCUMENTS

2004/0100457 A1* 5/2004 Mandle ................ G06F 1/1684
345/179
2013/0162589 A1   6/2013 Lien et al.
(Continued)

FOREIGN PATENT DOCUMENTS

| CN | 204808242 U | 11/2015 |
| CN | 107247521 A | 10/2017 |
| CN | 111897446 A | 11/2020 |

OTHER PUBLICATIONS

International Application No. PCT/CN2022/087796, International Search Report and Written Opinion mailed Jun. 29, 2022, 11 pages.

*Primary Examiner* — Roberto W Flores
(74) *Attorney, Agent, or Firm* — Zhong Law, LLC

(57) ABSTRACT

The present disclosure provides a device for detecting a fixation of a stylus and an intelligent interactive board. The device according to the present disclosure includes a first support, a switch assembly, a magnet assembly and an elastic assembly. The switch assembly is arranged on the first support. A side of the magnet assembly being away from the first support is used to adhere the stylus. The switch assembly includes a micro switch. The micro switch includes a triggering button. The triggering button is arranged facing the magnet assembly, and the magnet assembly includes a triggering part. The magnet assembly is movably connected with the first support, and the elastic assembly is arranged at a movable joint between the magnet (Continued)

assembly and the first support. The device according to the present disclosure can detect the state of the stylus reliably and effectively.

24 Claims, 10 Drawing Sheets

(56)             References Cited

U.S. PATENT DOCUMENTS

| | | | |
|---|---|---|---|
| 2018/0039343 A1* | 2/2018 | Park | G06F 3/03545 |
| 2018/0059817 A1* | 3/2018 | Pirie | G06F 3/03545 |
| 2018/0088690 A1* | 3/2018 | Seo | G06F 3/04162 |
| 2021/0055762 A1* | 2/2021 | Pai | G06F 3/03545 |
| 2021/0200339 A1* | 7/2021 | Kanas | G06F 3/03545 |
| 2022/0107665 A1* | 4/2022 | Wu | G06F 1/1656 |
| 2022/0413635 A1* | 12/2022 | Lin | F16M 13/02 |
| 2023/0187971 A1* | 6/2023 | An | G06F 3/038 |
| | | | 320/108 |
| 2024/0211055 A1* | 6/2024 | Zhao | H02J 7/342 |

\* cited by examiner

DEVICE FOR DETECTING FIXATION OF STYLUS AND INTELLIGENT INTERACTIVE BOARD

CROSS-REFERENCE TO RELATED APPLICATIONS

This application is the U.S. National Phase under 35. U.S.C. § 371 of International Application PCT/CN2022/087796, filed Apr. 20, 2022, which claims priority to Chinese Patent Application No. 202110496470.1, filed May 7, 2021. The disclosures of the above described applications are hereby incorporated by reference in their entirety.

TECHNICAL FIELD

The present disclosure relates to the field of electronic apparatuses, and in particular to a device for detecting a fixation of a stylus and an intelligent interactive board.

BACKGROUND

In some electronic products, such as commercial intelligent interactive boards or electronic blackboards for teachers and students, a stylus is provided on a side of an apparatus body for convenience. The stylus may be used to write on a screen surface of a commercial intelligent interactive board or an electronic blackboard, thereby completing interactive functions such as writing between a user and the apparatus.

In order for the intelligent interactive board or electronic blackboard to sense a state of the stylus being taken from or returned to from the side of the body of the intelligent interactive board or electronic blackboard by the user, and thus entering a corresponding writing or other interactive state, a connection status between the stylus and the apparatus body needs to be detected reliably and effectively.

SUMMARY

According to the present disclosure, a device for detecting a fixation of a stylus and an intelligent interactive board is provided, which can reliably and effectively detect a state of the stylus.

According to an aspect of the present disclosure, a device for detecting a fixation of a stylus is provided, including a first support, a switch assembly, a magnet assembly and an elastic assembly. The switch assembly is arranged on the first support. A side of the magnet assembly being away from the first support is used to adhere the stylus. The switch assembly includes a micro switch. The micro switch includes a triggering button. The triggering button is arranged facing the magnet assembly, and the magnet assembly includes a triggering part. The magnet assembly is movably connected with the first support, and the elastic assembly is arranged at a movable joint between the magnet assembly and the first support. When the device for detecting the fixation of the stylus detects the stylus, the magnet assembly moves away from the first support under an impact of an adhesive force of the stylus, and the triggering part is not in contact with the triggering button. When the device for detecting the fixation of the stylus fails to detect the stylus, the elastic assembly causes the magnet assembly and the first support to be in a bonding state, and the triggering part is in contact with the triggering button.

Therefore, the device for detecting the fixation of the stylus according to the present disclosure can reliably and effectively detect the state of the stylus.

According to another aspect of the present disclosure, an intelligent interactive board is further provided, including a frame, a stylus and the above-mentioned detection device. The device for detecting the fixation of the stylus is arranged inside the frame. The first support of the device for detecting the fixation of the stylus is fixedly connected with the frame. At least a part of the frame is formed with an installing part, and the stylus is placed on the installing part.

According to the present disclosure, a device for detecting a fixation of a stylus and an intelligent interactive board is provided. The device for detecting the fixation of the stylus according to the present disclosure includes a first support, a switch assembly, a magnet assembly and an elastic assembly. The switch assembly is arranged on the first support. The side of the magnet assembly being away from the first support is used to adhere the stylus. The switch assembly includes a micro switch. The micro switch includes a triggering button. The triggering button is arranged facing the magnet assembly. The magnet assembly includes a triggering part. The magnet assembly is movably connected with the first support, and the elastic assembly is arranged at a movable joint between the magnet assembly and the first support. When the device for detecting the fixation of the stylus detects the stylus, the magnet assembly moves away from the first support under an impact of an adhesive force of the stylus, and the triggering part is not in contact with the triggering button. When the device for detecting the fixation of the stylus fails to detect the stylus, the elastic assembly causes the magnet assembly and the first support to be in a bonding state, and the triggering part is in contact with the triggering button. The device for detecting the fixation of the stylus according to the present disclosure can detect the state of the stylus reliably and effectively.

BRIEF DESCRIPTION OF THE DRAWINGS

FIG. 3a is a schematic cross-sectional view of the device for detecting the fixation of the stylus in FIG. 2a.

FIG. 11b is a schematic diagram of a partially enlarged structure at A in FIG. 11a.

FIG. 12a is a cross-sectional view along a B-B direction of FIG. 11a.

FIG. 12b is another cross-sectional view along the B-B direction of FIG. 11a.

FIG. 13a is a schematic diagram of a partially enlarged structure at C in FIG. 12a.

REFERENCE NUMERALS

Figure 1:
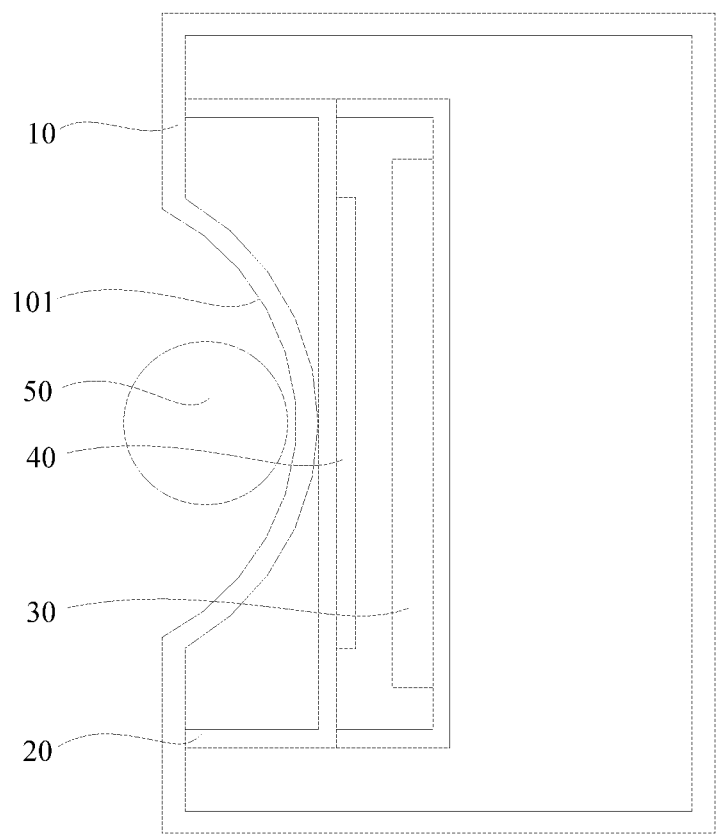
FIG. 1 is a schematic diagram of a partial structure of a display apparatus.

1—First support; 2—Switch assembly; 3—Magnet assembly; 4—Elastic assembly; 5—Positioning rib; 6—Reinforcing rib;
10—Frame; 20—Support; 30—Hall sensor; 40—Magnet; 50—Stylus; 60—Installing part; 11—First support body; 12—First protrusion; 13—Inner cavity; 14—Third clamping part; 15—Guiding hole; 16—Hand buckle; 17—Clamping part; 21—Micro switch; 22—Circuit board; 31—Second support; 32—Adhering member; 41—Elastic member; 42—Limiting member; 51—Guiding slope; 6a—First reinforcing rib; 6b—Second reinforcing rib; 6c—Third reinforcing rib;
101—Stylus positioning groove; 121—First through hole; 122—Second stopping part; 12a—Elastic supporting column; 123—Abutting flange; 124—Sliding section; 161—Fixing hole; 171—Extension arm; 1711—First extending part; 1712—Second extending part; 172—Clamping arm; 1721—First clamping arm; 1722—Second clamping arm; 1723—Slot; 311—Second support body; 312—Second protrusion; 313—Installing cavity; 314—Triggering part; 315—Positioning block; 421—Limiting body; 422—First clamping part; 423—First supporting part;
1231—Chamfer; 3121—Through hole; 3122—Second through hole; 3131—Top cavity wall; 3132—Bottom cavity wall; 3133—Opening; 4221—Inclined plate; 4222—Interval;
31211—Stepped surface; 31231—End face of stepped part; 31321—Second clamping part.

DESCRIPTION OF THE PREFERRED EMBODIMENTS

Hereinafter, the technical solutions in the present disclosure may be clearly and completely described in conjunction with the accompanying drawings in present disclosure. The described embodiments are part of the embodiments of the present disclosure, but not all examples.

Based on the embodiments in the present disclosure, all other embodiments obtained by those skilled in the art without making creative efforts may within the protection scope of the present disclosure. In the case of no conflict, the following embodiments and features in the embodiments may be combined with each other.

In the description of the present disclosure, it may be understood that the terms "center", "longitudinal", "transverse", "length", "width", "thickness", "upper", "lower", "front", "back", "left", "right", "vertical", "horizontal", "top", "bottom", "inner", "outer", "clockwise", "counterclockwise", "axial", "radial", "circumferential" and other indicated orientations or positional relationships are based on the orientations or positional relationships shown in the drawings. These terms are merely for the convenience of describing the present disclosure and simplifying the description, rather than indicating or implying that the referred device or elements may have certain orientations or be constructed and operated in certain orientations. Therefore, they may not be construed as limitations to the scope of the present disclosure.

In the present disclosure, terms such as "installation", "connection with", "connection" and "fixation" may be interpreted in a broad sense. For example, they may refer to a fixed connection, a detachable connection, or an integration. It may be directly connected or indirectly connected through an intermediary. It may be the internal communication of two elements or the interaction relationship between two elements. Those skilled in the art may understand the specific meanings of the above terms in the present disclosure according to specific situations.

It may be noted that in the description of the present disclosure, the terms "first" and "second" are merely used to describe different components conveniently, and may not be understood as indicating or implying a sequence relationship, relative importance, or implicitly indicating the number of technical features. Thus, the features defined as "first" and "second" may explicitly or implicitly include at least one of these features.

In some electronic products, such as commercial intelligent interactive boards or electronic blackboards used by teachers and students, a stylus is provided on a side of the device body for user convenience. The stylus may be used to write on a screen surface of commercial display apparatuses or learning machines, thereby enabling interactive functions such as writing between the user and the apparatus. In order for the intelligent interactive board or electronic blackboard to sense a state of the stylus being taken from or returned to the side of the body of the intelligent interactive board or electronic blackboard by the user, and thus enter into corresponding writing or other interactive states, a connection status between the stylus and the apparatus body needs to be detected reliably and effectively.

FIG. 1 is a schematic diagram of a partial structure of a display apparatus. As shown in FIG. 1, the existing commercial display apparatus includes a frame 10, a support 20, a Hall sensor 30, a magnet 40 and a stylus 50, where the support 20 is locked on the frame 10, and the support 20 is made of a magnetic material. The magnet 40 is fixed on the support 20 by an attractive force. The Hall sensor 30 is fixed on the support 20, and the Hall sensor 30 is located on a side of the magnet 40 being away from the stylus 50. The stylus 50 is attracted in a stylus positioning slot 101 on the frame 10 of the whole machine by magnetic force. The Hall sensor 30 is used to detect an adhesive state between the stylus 50 and the stylus positioning slot 101, so that the commercial display apparatus enters a corresponding writing or other interactive state.

However, when detecting an adhesive state between the stylus and the stylus positioning slot through the above structure, the following defects may be present. Firstly, due to the use principle of the Hall sensor, during real-time installation, an accurate value of an external magnetic field that can be monitored needs to be determined, resulting in multiple rounds of calibration, which leads to the limitation of the development of the above structure and slows down a processing efficiency of electronic apparatuses. Secondly, the Hall sensor mainly detects a magnetic field, and when an external magnetic field is present, the external magnetic field may easily interfere with the detection of the existing magnetic field by the Hall sensor, resulting in inaccurate signal feedback from the Hall sensor.

Therefore, the present disclosure provides a device for detecting a fixation of a stylus and an intelligent interactive board, which can overcome the above-mentioned deficiencies.

The present disclosure may be described in detail below in conjunction with the accompanying drawings and optional embodiments.

Figure 2A:
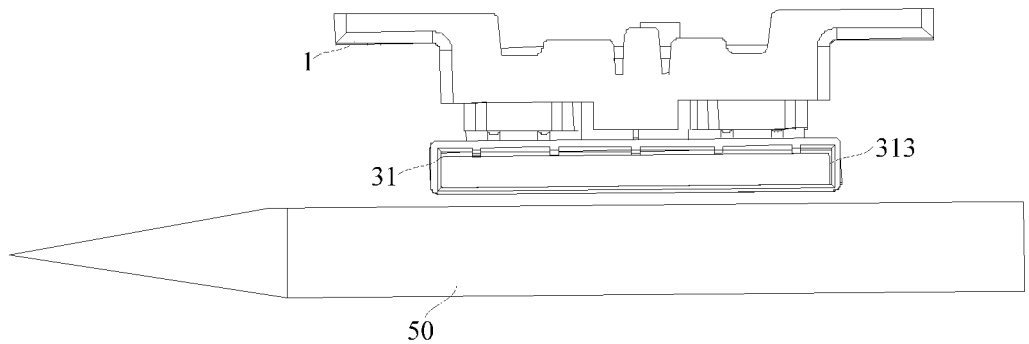
FIG. 2a is a schematic structural diagram of a device for detecting a fixation of a stylus according to an embodiment of the present disclosure.
Figure 2B:
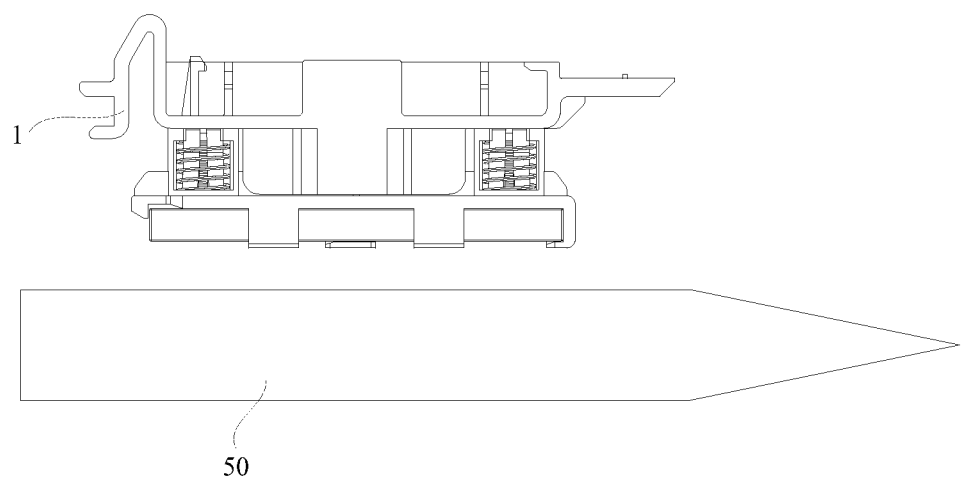
FIG. 2b is another structural schematic diagram of a device for detecting a fixation of a stylus according to an embodiment of the present disclosure.
Figure 3A:
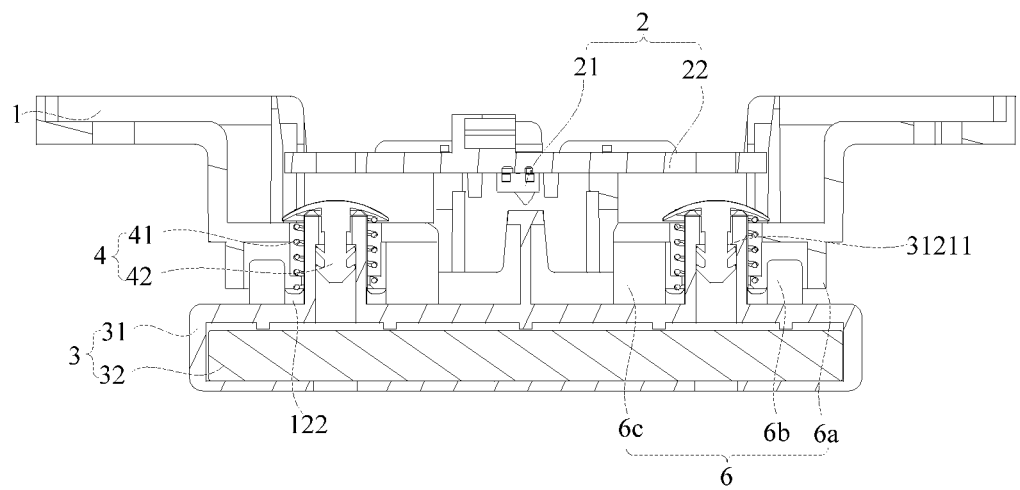
Figure 3B:
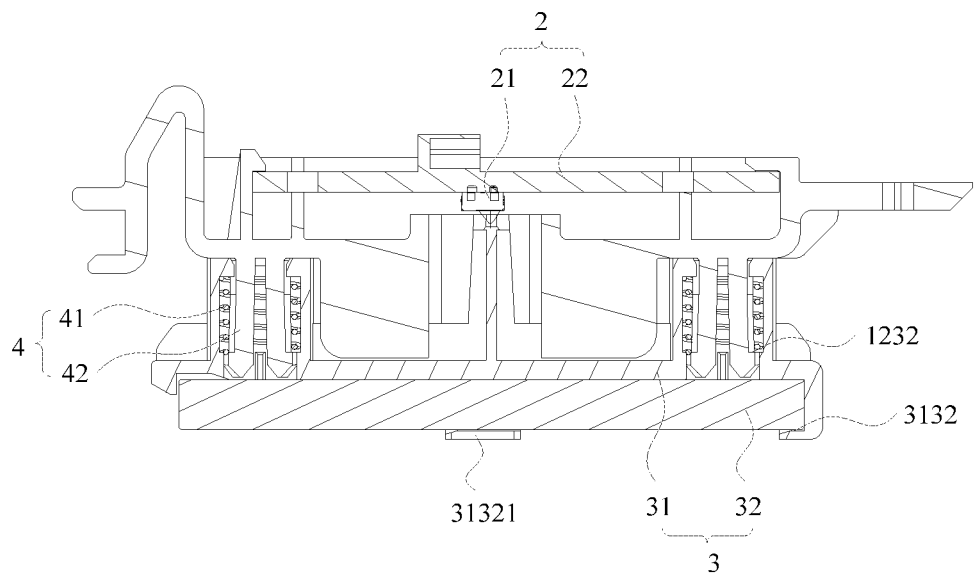
FIG. 3b is a schematic cross-sectional view of the device for detecting the fixation of the stylus in FIG. 2b.

FIG. 2a is a schematic structural diagram of a device for detecting a fixation of a stylus according to an embodiment of the present disclosure. FIG. 2b is another schematic structural diagram of a device for detecting a fixation of a stylus according to an embodiment of the present disclosure. FIG. 3a is a schematic cross-sectional view of the device for detecting the fixation of the stylus in FIG. 2a. FIG. 3b is a schematic cross-sectional view of the device for detecting the fixation of the stylus in FIG. 2b.

According to an embodiment of the present disclosure, a device for detecting a fixation of a stylus is provided, which may be arranged on an electronic apparatus, such as embedded in a housing of the electronic apparatus, so as to detect whether a stylus 50 is fixed at a preset position of the electronic apparatus. The electronic apparatus may be a commercial display panel or other apparatuses requiring a stylus.

As shown in FIGS. 2a to 3b, the device for detecting the fixation of the stylus includes components such as a first support 1, a switch assembly 2, a magnet assembly 3, and an elastic assembly 4. A side of the magnet assembly 3 being away from the first support 1 is used to place and adhere the stylus 50. The switch assembly 2 includes a micro switch 21. The micro switch 21 includes a triggering button. The triggering button is arranged facing the magnet assembly 3. The magnet assembly includes a triggering part 314, so that the micro switch 21 may be used to send a detection signal when being triggered. The magnet assembly 3 is movably connected with the first support 1, and the elastic assembly 4 is arranged at a movable joint between the magnet assembly 3 and the first support 1. When the device for detecting the fixation of the stylus detects the stylus 50, the magnet assembly 3 moves away from the first support 1 under an impact of an adhesive force of the stylus 50, and the triggering part 314 is not in contact with the triggering button (this case may correspond to a button releasing state). Thus, the device for detecting the fixation of the stylus detects that the stylus 50 is in an adhesive state. When the device for detecting the fixation of the stylus fails to detect the stylus 50, the elastic assembly 4 causes the magnet assembly 3 and the first support 1 to be in a bonding state, and the triggering part 314 contacts with the triggering button, and correspondingly, the device for detecting the fixation of the stylus detects that the stylus 50 is in a detaching state.

When the stylus 50 is in the adhesive state, the stylus 50 is fixed on the device for detecting the fixation of the stylus or on the electronic apparatus. When the stylus 50 is in the detaching state, the stylus 50 detaches from the electronic apparatus and may perform writing and other operations.

It may be noted that the micro switch 21 may include a transmission mechanism and an action reed. Alternatively, when the magnet assembly 3 abuts against the micro switch 21, the force generated by the magnet assembly 3 acts on the action reed through the transmission mechanism, so that a fixed contact and a movable contact at an end of the micro switch 21 are quickly connected. When the magnet assembly 3 leaves the micro switch 21, the force on the transmission mechanism disappears, and then the force on the action reed disappears, which promotes the fixed contact and the moving contact at the end of the micro switch 21 to disconnect quickly. The transmission mechanism may be a structure such as a button, a lever, a roller, etc. Herein, no specific limitation is imposed on the transmission mechanism.

In some of the optional embodiments of the present disclosure, at least a part of the magnet assembly 3 is magnetic, and the stylus 50 includes a built-in iron core, so that mutual attraction between the magnet assembly 3 and the stylus 50 may be realized, and the stylus 50 may be located in a placement position.

In some other implementations, the stylus 50 may also have a built-in magnetic member, such as a magnet that is consistent with the extending direction of the stylus 50, and magnetically adhere the magnet assembly 3 through the magnet. Herein, there is no limitation on the type of the magnetic member.

Figure 4A:
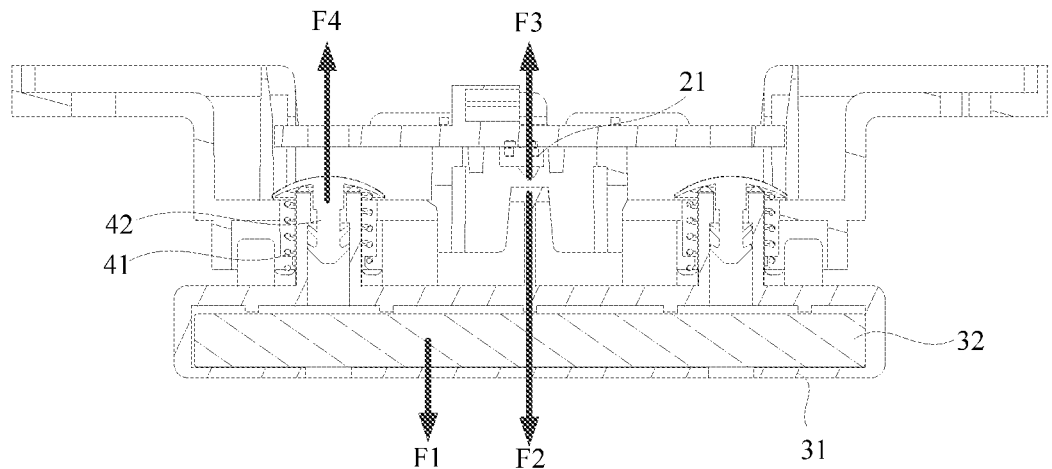
FIG. 4a is a schematic diagram of force analysis of a device for detecting a fixation of a stylus according to an embodiment of the present disclosure.
Figure 4B:
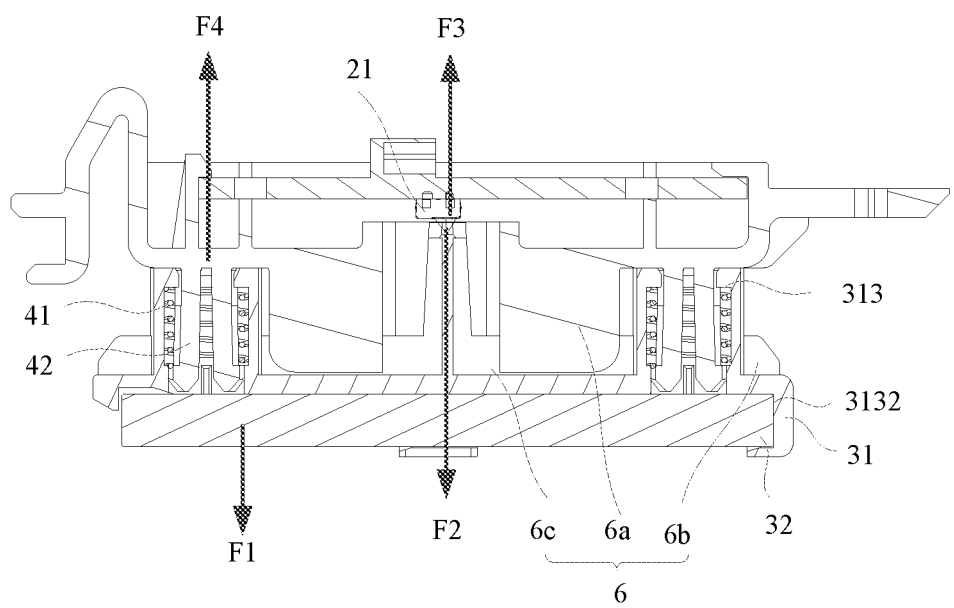
FIG. 4b is a schematic diagram of force analysis of another device for detecting a fixation of a stylus according to an embodiment of the present disclosure.

FIG. 4a is a schematic diagram of force analysis of a device for detecting a fixation of a stylus according to an embodiment of the present disclosure. FIG. 4b is a schematic diagram of force analysis of another device for detecting a fixation of a stylus according to an embodiment of the present disclosure.

It may be noted that an attractive force generated by the stylus on the magnet assembly 3 is F1, a pressure generated by the micro switch 21 on the magnet assembly 3 is F2, a friction force generated between the magnet assembly 3 and the micro switch 21 is F4, and an elastic force generated by the elastic assembly 4 on the first support 3 is F3.

Alternatively, in the device for detecting the fixation of the stylus according to this embodiment, during the process of placing the stylus 50 to the placement position, as the stylus 50 approaches the magnet assembly 3, due to the mutual attraction between the magnet assembly 3 and the stylus 50, and F1+F2>F4+2F3 at this time, the magnet assembly 3 moves away from the first support 1, so that the magnet assembly 3 leaves a position where it abuts against the micro switch 21. During the process of removing the stylus 50 from the placement position, as the stylus 50 being away from the magnet assembly 3, under the elastic force of the elastic assembly 4, and F1+F2<F4+2F3 at this time, and thus, the magnet assembly 3 and the first support 1 are close to each other, and at least part of the magnet assembly 3 abuts against and triggers the micro switch 21. During this process, the pressing and releasing of the magnet assembly 3 relative to the micro switch 21 is realized, so that the conversion between the electrical signals "0" and "1" is realize, and the use state of the stylus 50 is detected.

Figure 5A:
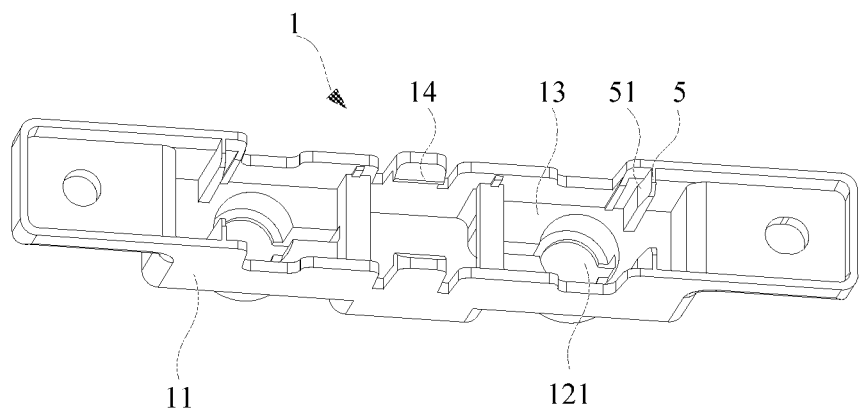
FIG. 5a is a schematic diagram of a three-dimensional structure of a first support in a device for detecting a fixation of a stylus according to an embodiment of the present disclosure.
Figure 5B:
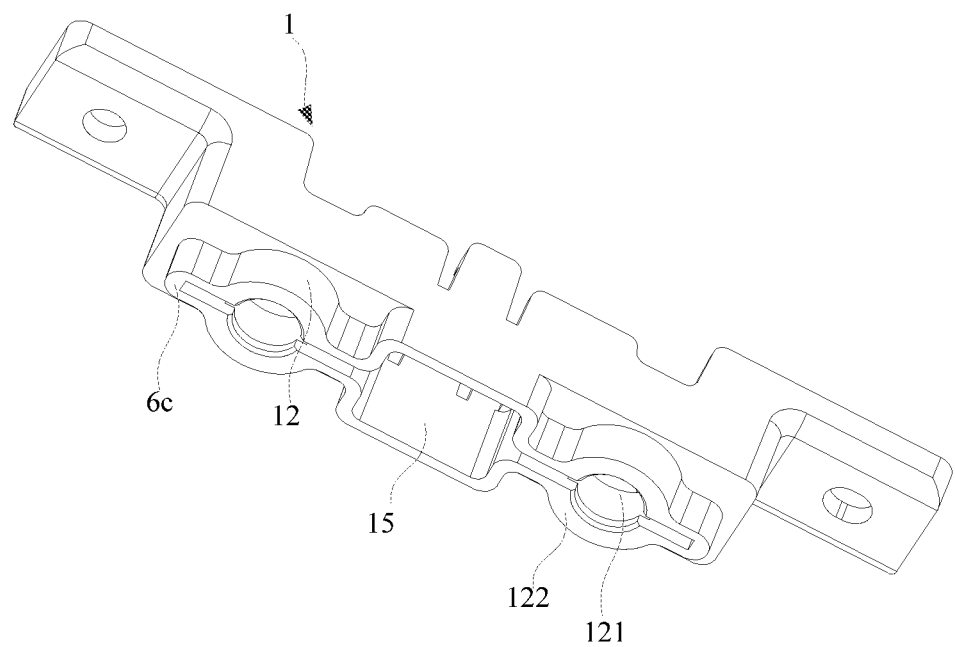
FIG. 5b is a schematic diagram of another three-dimensional structure of a first support in a device for detecting a fixation of a stylus according to an embodiment of the present disclosure.
Figure 6:
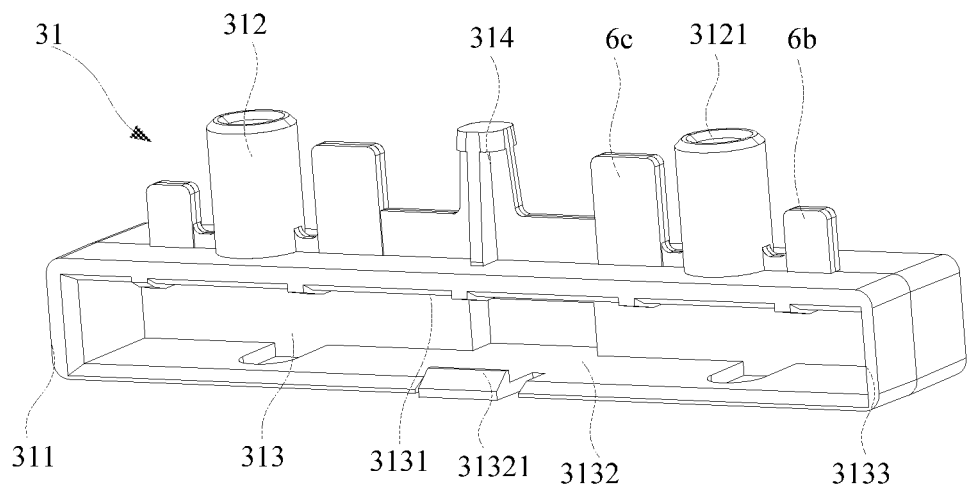
FIG. 6 is a schematic diagram of a three-dimensional structure of a second support in a device for detecting a fixation of a stylus according to an embodiment of the present disclosure.

FIG. 5a is a schematic diagram of a three-dimensional structure of a first support in a device for detecting a fixation of a stylus according to an embodiment of the present disclosure. FIG. 5b is a schematic diagram of another three-dimensional structure of a first support in a device for detecting a fixation of a stylus according to an embodiment of the present disclosure. FIG. 6 is a schematic diagram of a three-dimensional structure of a second support in a device for detecting a fixation of a stylus according to an embodiment of the present disclosure.

As shown in FIGS. 3a to 6, in an optional implementation of this embodiment, the first support 1 includes a first support body 11 and a first protrusion 12 connected to the first support body 11, and the magnet assembly 3 includes a second supports 31, and the first protrusion 12 protrudes towards the second support 31. The second support 31 includes a second support body 311 and a second protrusion 312, and the second protrusion 312 protrudes towards the first support 1, and the first protrusion 12 is movably connected to the second protrusion 312. The elastic assembly 4 includes an elastic member 41, and a first end of the elastic member 41 abuts against an end of the second protrusion 312. A second end of the elastic member 41 abuts against the end of the first protrusion 12. Under an elastic force of the elastic member 41, the end of the first protrusion 12 moves towards the second support 31, and the end of the second protrusion 312 moves towards the first support 1, and the first support 1 and the second support 31 approach towards each other.

Alternatively, during the process of removing the stylus 50 from the placement position, as the stylus 50 moves away from the magnet assembly 3, due to the existence of a part of structures in the second support 31 (such as the second protrusion 312) extending to a side of the first support 1 being away from the second support 31, or the existence of a part of the structure in the first support 1 extending to a side of the second support 31 being away from the first support 1, the elastic force of the elastic member 41 promotes the corresponding parts of the second protrusion 312 and the first support 1 to move in opposite directions, so that the first support 1 and the second support 31 are close to each other. Therefore, at least part of the second support 31 abuts against the micro switch 21, and detection of the state where the stylus 50 is at the placement position is realized.

It may be noted that, to process and manufacture the device for detecting the fixation of the stylus according to this embodiment, in this embodiment, both the first support 1 and the second support 31 are plastic parts that are easy to form.

Based on the different ways of fixing the elastic member 41 by the first support 1 and the second support 31, correspondingly, the first support 1 and the second support 31 have different optional structures, which allows the elastic members 41 to have different installation and connection methods. Hereinafter, examples are taken for illustration.

In an optional installation method of an elastic member, the first protrusion 12 includes a first through hole 121, and the first through hole 121 passes through the first protrusion 12 and communicates with an inner cavity 13. The end of the second protrusion 312 extends from the first through hole 121 to a side of the first support body 11 being away from the second support body 311.

Thus, due to the existence of the first through hole 121, the second protrusion 312 in the second support 31 may extend from one side of the first support 1 to the other side. When the two ends of the elastic member 41 respectively abut against or connected to the second protrusion 312 and the first support 1 in other ways, the first support 1 and the second support 31 may approach towards each other by the elastic force of the elastic member 41 itself.

At this time, an annular gap may be formed between the second protrusion 312 and the first through hole 121. Optionally, the elastic member 41 is sleeved on an outer wall of the second protrusion 312, and is positioned axially in a gap between an inner wall of the first through hole 121 and the outer wall of the second protrusion 312.

In some optional embodiments, the first support body 11 includes the hollow inner cavity 13. The first through hole 121 communicates with the inner cavity 13, and the second protrusion 312 may extend into the inner cavity 13.

In some embodiments, the elastic member 41 may be a compression spring. It may be noted that, in general, the compression spring is used to push the object at the top of the compression spring from the center to the top, and to push the object at the bottom of the compression spring from the center to the bottom. In the present disclosure, the function of the elastic member 41 is to push the magnet assembly 3 at a first end of the elastic member 41 to a second end of the elastic member 41, and to push the first support 1 at a second end of the elastic member 41 to a first end of the elastic member 41. Therefore, in the present disclosure, the force direction of the magnet assembly 3 and the first support 1 is opposite to that of the object at both ends of the compression spring in general.

Therefore, in the optional implementation of this embodiment, it is necessary to provide a limiting structure on the magnet assembly 3 or the first support 1 so as to complete the transformation of the direction of force between the magnet assembly 3 and the first support 1.

Figure 7:
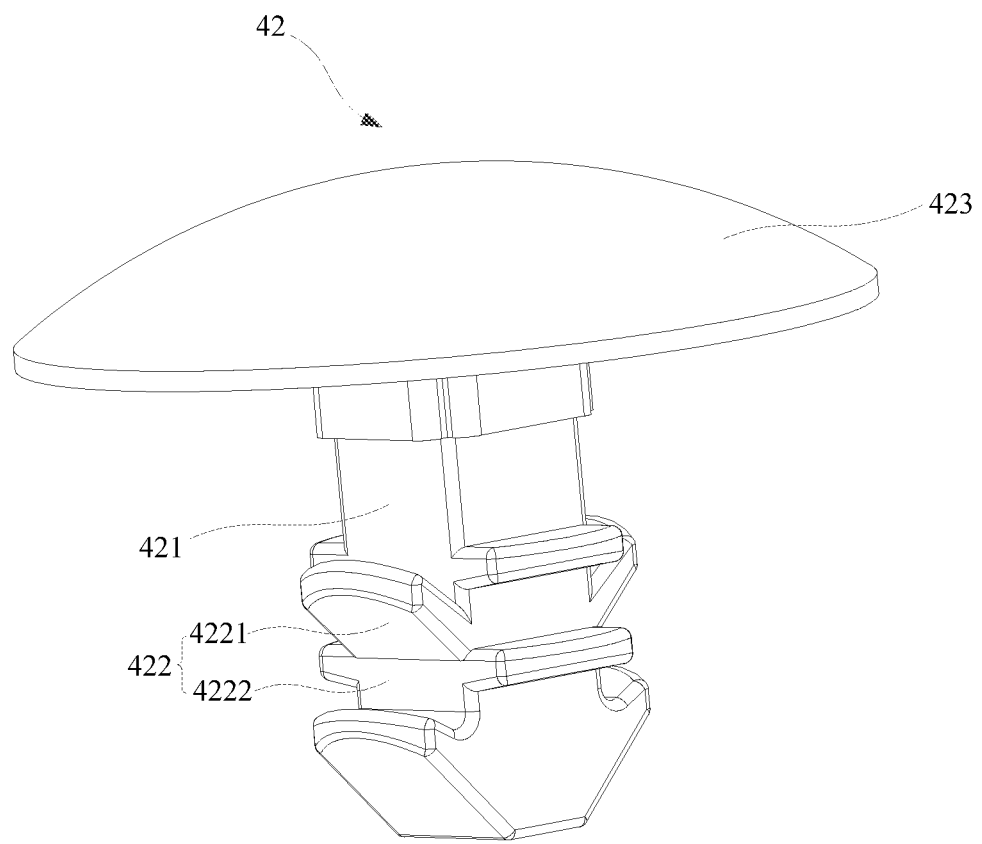
FIG. 7 is a schematic diagram of a three-dimensional structure of a limiting member in a device for detecting a fixation of a stylus according to an embodiment of the present disclosure.

FIG. 7 is a schematic diagram of a three-dimensional structure of a limiting member in a device for detecting a fixation of a stylus according to an embodiment of the present disclosure.

As shown in FIGS. 2a, 3a, 4a, 5a to 7, to complete the transformation of the force direction of the magnet assembly 3 and the first support 1, in the optional implementation of this embodiment, the elastic assembly 4 further includes a limiting member 42. The limiting member 42 is arranged at the end of the second protrusion 312. The limiting member 42 includes a limiting body 421, a first clamping part 422 and a first stopping part 423. The first clamping part 422 is arranged on an end of the limiting body 421 facing the second support 31. The first stopping part 423 is arranged on an end of the limiting body 421 being away from the second support 31. The first end of the first clamping part 422 connects with the limiting body 421, and the second end of the first clamping part 422 extends towards the micro switch 21. The second protrusion 312 includes a through hole 3121 communicating with the end of the second protrusion 312. The inner wall of the through hole 3121 includes a stepped surface 31211, the first clamping part 422 extends into the through hole 3121, and the second end of the first clamping part 422 abuts against the stepped surface 31211 to clamp the second protrusion 312 with the limiting member 42, so that the force generated by the elastic member 41 on the magnet assembly 3 may promote the movement of the magnet assembly 3 to the side of the first support 1, and further at least part of the magnet assembly 3 may collide with the micro switch 21.

To improve the speed of the installation between the limiting member 42 and the second support 31, in the embodiment of the present disclosure, the limiting member 42 may also be a plastic part that may produce a large amount of deformation. This approach not only facilitates a fast connection between the limiting member 42 and the second support 31, but also ensures a reliable connection between the limiting member 42 and the second support 31.

In some optional embodiments, the limiting body 421 is a columnar body, such as a prism or a cylinder, and the first clamping part 422 may be an annular plate-shaped member or include multiple inclined plates 4221 arranged at intervals. The first stopping part 423 may be a plate-shaped member.

In the optional implementation of this embodiment, the limiting body 421 is a quadrangular prism. The limiting body 421 includes a number of first clamping parts 422 distributed along its axial direction, and the first clamping parts 422 include a number of inclined plates 4221 arranged at intervals, and the inclined plates are connected to the corresponding side wall surface of the limiting body 421. An interval 4222 is formed between adjacent inclined plates 4221, and in the axial direction of the limiting body 421, of two adjacent first clamping parts 422, the inclined plates 4221 of one is opposite to the interval 4222 of the other. In addition, the first clamping part 422 on the side close to the first stopping part 423 abuts against the stepped surface 31211. Both end surfaces of the first stopping part 423 protrude in a direction being away from the limiting body 421.

It may be noted that the limiting body 421, the first clamping part 422 and the first stopping part 423 may also include structures of other shapes, and the optional shapes of the limiting member 42 in other embodiments are not limited herein.

To ensure that at least part of the magnet assembly 3 may effectively press and release the micro switch 21 to realize conversion between electrical signals "0" and "1", In the optional implementation of this embodiment, the triggering part 314 is located on the second support 31, and the triggering part 314 is located between the two second protrusions 312. The first support 1 includes a guiding hole 15, the guiding hole 15 is located between the two first protrusions 12, and the guiding hole 15 communicates with the first through hole 121, and the end of the triggering part 314 may pass through the guiding hole 15 and collide with the micro switch 21.

As an optional embodiment, the guiding hole 15 is a square hole, and the triggering part 314 includes a conical structure, with its radial dimension gradually decreases from the root to the end of the triggering part 314.

To limit the axial position of the elastic member 41, a length of the first stopping part 423 in the radial direction of the second protrusion 312 is greater than a diameter of the second protrusion 312. The first end of the elastic member 41 abuts against the side of the first stopping part 423 facing the first clamping part 422. An end of the first protrusion 12 includes a second stopping part 122 protruding inward, and a second end of the elastic member 41 abuts against the second stopping part 122. Thus, the axial position of the elastic member 41 may be limited, and the stability of the elastic member 41 may be improved.

Further, to limit the radial position of the elastic member 41, as an optional embodiment, a radial edge of the first stopping part 423 protrudes in a direction being away from the micro switch 21, and a first end of the elastic member 41 abuts against a region surrounded by the radial edge of the first stopping part 423. Thus, the stability of the elastic member 41 may be further improved to prevent the elastic member 41 from moving.

To further limit the position of the elastic member 41, in this embodiment, the through hole 3121 and the first through hole 121 are both circular holes, and the through hole 3121 and the first through hole 121 are concentrically arranged. Thus, it is possible to further effectively limits the position of the elastic member 41.

Figure 8A:
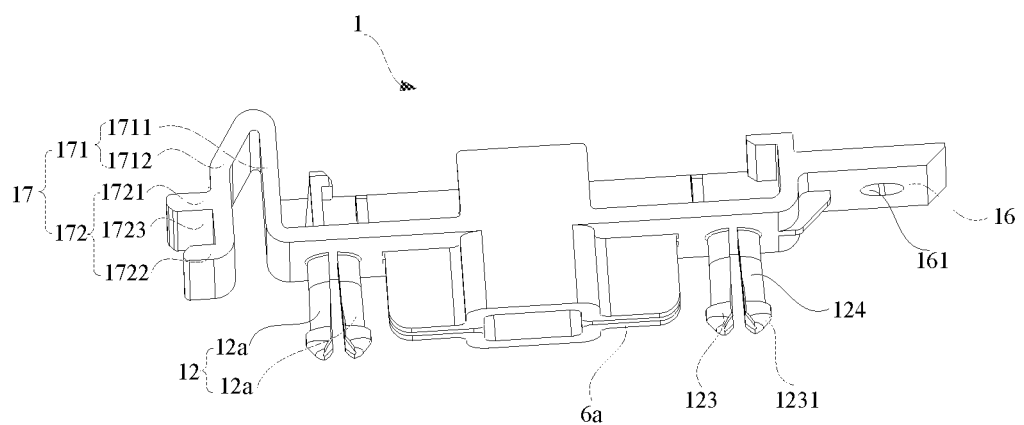
FIG. 8a is a schematic diagram of a three-dimensional structure of another first support in a device for detecting a fixation of a stylus according to an embodiment of the present disclosure.
Figure 8B:
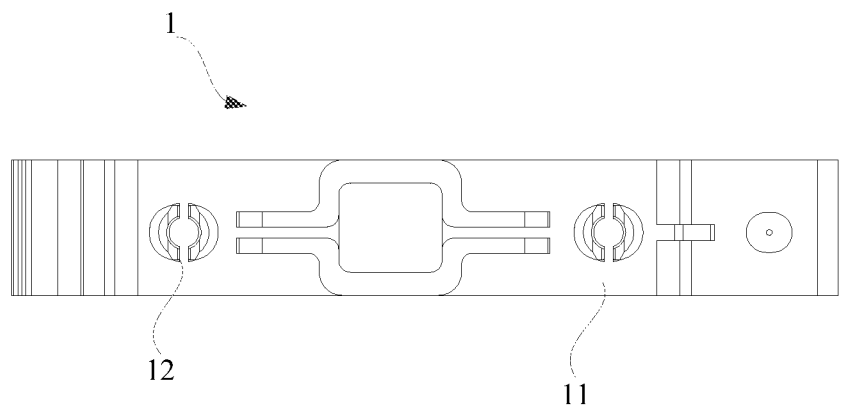
FIG. 8b is a schematic plan view of another first support in a device for detecting a fixation of a stylus according to an embodiment of the present disclosure.
Figure 9A:
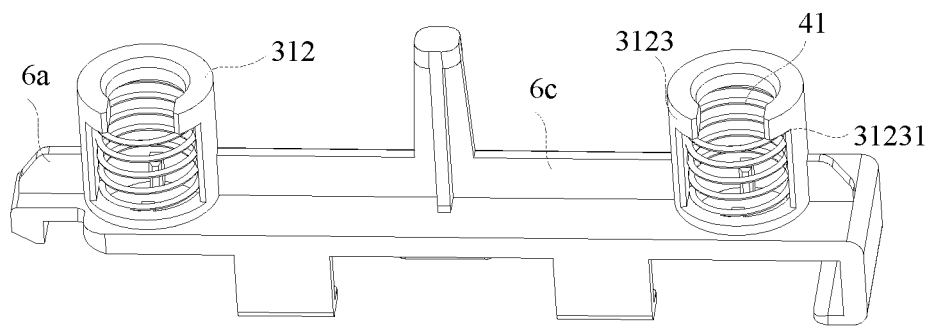
FIG. 9a is a schematic diagram of a connection relationship between the second support and the elastic member in another device for detecting a fixation of a stylus according to an embodiment of the present disclosure.
Figure 9B:
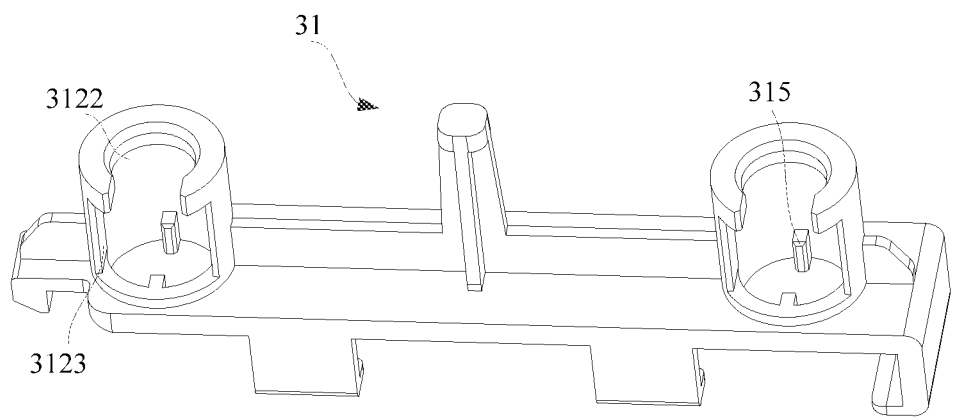
FIG. 9b is a schematic diagram of a three-dimensional structure of another second support in a device for detecting a fixation of a stylus according to the embodiment of the present disclosure.

FIG. 8a is a schematic diagram of a three-dimensional structure of another first support in a device for detecting a fixation of a stylus according to an embodiment of the present disclosure. FIG. 8b is a schematic plan view of another first support in a device for detecting a fixation of a stylus according to an embodiment of the present disclosure. FIG. 9a is a schematic diagram of a connection relationship between the second support and the elastic member in another device for detecting a fixation of a stylus according to an embodiment of the present disclosure. FIG. 9b is a schematic diagram of a three-dimensional structure of another second support in a device for detecting a fixation of a stylus according to the embodiment of the present disclosure.

As shown in FIGS. 2b, 3b, 4b, 8a to 9b, in another optional installation method of the elastic member 41, a hole or cavity structure may be provided on the second protrusion 312, and the second protrusion 12 extends into the cavity structure of the second protrusion 312. Alternatively, the second protrusion 312 includes a second through hole 3122, and the second through hole 3122 passes through an end of the second protrusion 312 facing the first support body 11. The first protrusion 12 extends into the second through hole 3122. A stepped part 3123 is disposed within the second through hole 3122, and the elastic member 41 abuts between the end surface 31231 of the stepped part and the end of the first protrusion 12.

At this time, the first protrusion 12 of the first support 1 may extend from one side of the second support 31 to the other side, that is, part of the structure in the second support 31, such as the stepped part 3123 may be located on the first support body 1111 and the first protrusion 12. Correspondingly, similar to the installation method of the former elastic member 41, when the elastic member 41 abuts between the stepped part 3123 and the end of the first protrusion 12, the elastic force of the elastic member 41 itself may make the first support 1 close to the second support 31.

To allow the first protrusion 12 to freely pass through the second through hole 3122 and maintain a stable connection with the elastic member 41, optionally, the first protrusion 12 includes at least two elastic supporting columns 12a extending along a length direction of the first protrusion 12. A gap is presented between at least two elastic supporting columns 12a. The end of the elastic supporting column 12a includes an abutting flange 123, and the elastic member 41 abuts between the end surface 31231 of the stepped part and the abutting flange 123.

Thus, during the process of passing through the second through hole 3122, the elastic supporting column 12a may be pressed inwardly under the pressure of the hole wall of the second through hole 3122 or the inner edge of the elastic member 41, so as to pass through the second through hole 3122 smoothly. After passing through the second through hole 3122, the elastic supporting column 12a expands outward freely, so that the abutting flange 123 may reliably abut against the end of the elastic member 41.

In some optional embodiments, the outer contour of the cross-sectional figure of the elastic supporting column 12a along its radial direction is a semi-elliptical outer peripheral contour or a semicircular outer peripheral contour. Herein, there are no specific restrictions on the cross-sectional shape of the elastic supporting column 12a along its radial direction.

As an optional structure, a side of the abutting flange 123 facing away from the first support body 11 includes a chamfer 1231. A side of the abutting flange 123 facing the first support body 11 includes an abutting end surface 1232. Through the guiding effect of the chamfer 1231, the elastic supporting column 12a may be prevented from colliding with structures such as elastic member 41 and from advancing when passing through the second through hole 3122. At the same time, the abutting end surface 1232 of the abutting flange 123 may also reliably fix the elastic member 41, thereby facilitating the elastic member 41 applying elastic force. The direction of the abutting end surface 1232 and the length direction of the elastic supporting column 12a may be kept perpendicular to each other.

To allow the elastic supporting column 12a to move in a predetermined direction, optionally, the elastic supporting column 12a includes a sliding section 124. A radial dimension of the sliding section 124 matches an inner edge dimension of the stepped part 3123, and a length of the sliding section 124 in an axial direction of the first protrusion 12 is greater than a sum of a thickness of the stepped part 3123 and a moving stroke of the second support 31 in this axial direction. In this way, the sliding section 124 may cooperate with the shape of the second through hole 3122 to maintain the position of the elastic supporting column 12a in the second through hole 3122. At the same time, the sliding section 124 includes a longer length in the axial direction of the first protrusion 12, which can avoid structural interference and collision when the first support 1 and the second support 31 move relative towards each other, thereby maintaining a smooth moving effect.

Correspondingly, in an optional manner, a positioning block 315 may be provided on the second support 31, and a shape of the positioning block 315 may match the gap between the plurality of elastic supporting columns 12a, so as to match the second through hole 3122 to further position the elastic supporting column 12a.

In this embodiment, there may be two elastic supporting columns 12a, and the two elastic supporting columns 12a are arranged symmetrically. In this way, when an external pressure is applied to the two elastic supporting columns 12a, they may move closer to each other so as to pass through the second through hole 3122. This design leads to a more balanced distribution of forces on the elastic supporting columns 12a. It may be understood that the number of elastic supporting columns 12a may also be other numbers, such as three. The number of elastic supporting columns 12a are arranged symmetrically or axially symmetrically with respect to the axial direction of the second through hole 3122 for being balanced in force.

Since an opening of the second through hole 3122 is provided with the stepped part 3123, to ensure the abutting and fixing effect on the elastic member 41, an inner edge dimension of the stepped part 3123 is smaller than the dimension of the elastic member 41 in this direction. At this time, to facilitate the installation of the elastic member 41, optionally, the second protrusion 312 is provided with an installation groove 3123. The installation groove 3123 communicates with the second through hole 3122, so that the elastic member 41 enters into and exits from the second through hole 3122 through the installation groove 3123. Alternatively, the installation groove 3123 is opened on a side wall of the second protrusion 312.

To ensure the stability of the magnetic assembly 3 during the movement, in this embodiment, the number of elastic assemblies 4 is two, and a distribution direction of the two elastic assemblies 4 is consistent with an extension direction of the stylus 50. The number of the second protrusions 312 is two, and the second protrusions 312 are arranged corresponding to the elastic assemblies 4. Alternatively, the two elastic assemblies 4 and the two second protrusions 312 are axially symmetrical with respect to the center line of the second support 31.

To facilitate the connection between the device for detecting the fixation of the stylus and the electronic apparatus, optionally, opposite sides of the first support body 11 are respectively provided with a hand buckle 16 and a clamping part 17. The clamping part 17 is used to clamp with the housing of the electronic apparatus. The hand buckle 16 is used to abut against an end of the housing of the electronic apparatus opposite to the clamping part 17, and at least a part of the hand buckle 16 is exposed outside the housing of the electronic apparatus.

In some optional embodiments, the hand buckle 16 protrudes from the first support body 11, and the extension direction of the hand buckle 16 is consistent with the length direction of the first support body 11. The hand buckle 16 is provided with a fixed hole 161, and the hand buckle 16 is detachably connected to the housing of the electronic apparatus through a threaded fastener passing through the fixing hole 161. It may be noted that the hand buckle 16 is also connected to the housing of the electronic apparatus in other connection methods, and there is no limitation on the connection method between the hand buckle 16 and the housing of the electronic apparatus herein.

Further, in some embodiments, the clamping part 17 includes an extension arm 171 and a clamping arm 172. The extension arm 171 includes a first extending part 1711 and a second extending part 1712 connected in sequence. A first end of the first extending part 1711 is connected to the first support body 11. A second end of the first extending part 1711 extends in direction being away from the first support body 11, and the extension direction of the first extending part 1711 is consistent with the height direction of the first support body 11. A first end of the second extending part 1712 is connected to the second end of the first extending part 1711, and a second end of the second extending part 1712 extends to the side of the first support body 11 along its length direction, so that a certain angle is formed between the first extension extending part 1711 and the second extending part 1712. The clamping arm 172 includes a first clamping arm 1721 and a second clamping arm 1722. The first clamping arm 1721 and the second clamping arm 1722 are connected to the second extending part 1712. The first clamping arm 1721 and the second clamping arm 1722 are distributed parallel in a height direction of the first support body 11, and the extension directions of the first clamping arm 1721 and the second clamping arm 1722 are consistent with the length direction of the first support body 11. A slot 1723 is formed between the first clamping arm 1721 and the second clamping arm 1722. The housing of the electronic apparatus may extend into the slot 1723 and be connected to the clamping part 17.

To realize the magnetic adhesion between the magnet assembly 3 and the stylus 50, in this embodiment, the magnet assembly 3 further includes an adhering member 32 that may magnetically adhere with the stylus 50. Optionally, the adhering member 32 may be a magnet or an iron core. When the adhering member 32 is a magnet, the stylus 50 may have a built-in iron core or magnet. When the adhering member 32 is an iron core, the stylus 50 may have a built-in magnet.

However, in actual production, a device for detecting a fixation of a stylus is installed on a display apparatus, and the display apparatus may be equipped with a plurality of stylus 50. The actual number of styluses 50 may be far more than the device for detecting the fixation of the stylus. Considering the high cost of the magnet, in the implementation of this embodiment, the adhering member 32 is a magnet, and the stylus 50 includes a built-in iron core.

As shown in FIGS. 2a to 9b, to install the adhering member 32 on the second support 31, in some embodiments, a side of the second support 31 being away from the micro switch 21 includes an installing cavity 313, the installing cavity 313 includes a top cavity wall 3131 facing the micro switch 21 and a bottom cavity wall 3132 being away from the micro switch 21. The length direction of the installing cavity 313 is perpendicular to a moving direction of the magnet assembly 3. A lateral cavity wall of the installing cavity 313 along the length direction includes an opening 3133, and the adhering member 32 is installed in the installing cavity 313 through the opening 3133.

In this way, not only the adhering member 32 may be installed on the second support 31, but also the adhering member 32 may be installed in the installing cavity 313 in the width direction of the second support 31. Therefore, during the manufacturing process of the second support 31, it may be ensured that the opening direction of the cavity is consistent with the installation direction of the adsorbent 32, so as to prevent the cavity from opening along the length direction of the second support 31, thereby avoiding difficulty during injection molding of the second support 31 due to the high depth of the cavity.

To realize the reliable connection between the adhering member 32 and the second support 31, in this embodiment, the bottom cavity wall 3132 of the installing cavity 313 includes a second clamping part 31321, and the second clamping part 31321 is used to limit the adhering member 32 in the installing cavity 313.

In addition, as compared the opening direction of the above-mentioned installing cavity 313 with opening along the thickness direction of the second support 31, when the outer wall surface of the bottom cavity wall 3132 is a main force-bearing surface, the above-mentioned opening direction can prevent the adhering member 32 from coming off. Therefore, the overall reliability of the magnet assembly 3 can be improved. Moreover, if the cavity is opened along the thickness direction of the second support 31, considering the convenience of installation, the thickness of the second clamping part 31321 becomes larger at this time, which may increase the distance between the adhering member 32 and the built-in iron core of the stylus 50, affecting the magnitude of the adhering force generated by the adhering member 32 on the stylus 50, thereby affecting the holding feel of the stylus 50 when the stylus 50 is taken off.

In the optional implementation of this embodiment, to realize the conversion of the micro switch 21 between the electrical signals "0" and "1", in this embodiment, the switch assembly 2 further includes a circuit board 22. The circuit board 22 is mounted on the first support 1. The micro switch 21 is connected to the circuit board 22, and the micro switch 21 is electrically connected to the circuit board 22.

To facilitate the installation of the circuit board 22 on the first support 1, the device for detecting the fixation of the stylus according to this embodiment further includes a plurality of positioning ribs 5. The plurality of positioning ribs 5 are arranged in the inner cavity 13, and the plurality of positioning ribs 5 are distributed on both sides of the circuit board 22 along the length direction of the first support 1. The ends of the positioning ribs 5 extend away from the second support 31. Thereby, the positioning ribs 5 can guide the installation of the circuit board 22, so as to realize quick installation between the circuit board 22 and the first support 1.

To further realize the fast installation between the circuit board 22 and the first support 1, the side of the positioning rib 5 facing the circuit board 22 includes a guiding slope 51, and the guiding slope 51 extends from a root of the positioning rib 5 to an end of the positioning rib 5. In this way, the installation of the circuit board 22 may be further guided, and the rapid installation between the circuit board 22 and the first support 1 can be further realized.

To reliably install the circuit board 22 on the first support 1, as an optional embodiment, a side of the first support 1 being away from the second support 31 includes two third clamping parts 14, that is, the side of the inner cavity 13 being away from the second support 31 includes two third clamping parts 14. A distribution direction of the two third clamping parts 14 is consistent with an extension direction of the cavity bottom of the installing cavity 313, and the two third clamping parts 14 are used to limit the circuit board 22 within the first support 1.

To facilitate the injection molding of the first support 1, in this embodiment, the third clamping part 14 is located in the middle of the first support 1. Since the touch direction of the first support 1 during the molding process is along its height, positioning the third clamping part 14 in the middle of the first support 1 ensures that the hole where the third clamping part 14 is located coincides with the hole where the micro switch 21 is located during the touch process. Compared with the arranging position of other third clamping part 14, the arranging position of the third clamping part 14 in this embodiment not only ensure that the ejection direction of the first support 1 is single but also avoid processing additional hole positions on the first support 1. It ensures the integrity of the first support 1 and further improves the reliability of the first support 1. In addition, this positioning simplifies the mold manufacturing process for the first support 1 and reduces the manufacturing costs.

However, the device for detecting the fixation of the stylus according to this embodiment is mostly in a flat state during use, with the opening 3133 oriented along the vertical direction facing upwards. Under the influence of gravity, to prevent changes in the shape of the first support 1 and the second support 31, which may lead to a change in the attractive force of the adhering member 32 to the stylus 50, the device for detecting the fixation of the stylus according to this embodiment includes a plurality of reinforcing ribs 6. The plurality of reinforcing ribs 6 include a first reinforcing rib 6a, a second reinforcing rib 6b and a third reinforcing rib 6c. The first reinforcing rib 6a is arranged on the first support 1. The second reinforcing rib 6b and the third reinforcing rib 6c are arranged on the second support 31. The ends of both the second reinforcing rib 6b and the third reinforcing rib 6c extend towards the first support 1. The second protrusion 312 is located between the second reinforcing rib 6b and the third reinforcing rib 6c, and the third reinforcing rib 6c is located on a side of the second support 31 close to a center of the second protrusion 312. The end of the first reinforcing rib 6a extends towards the second support 31, and the first reinforcing rib 6a is located on the side of the second reinforcing rib 6b being away from the second protrusion 312. In this way, the strength of the first support 1 and the second support 31 can be enhanced to ensure that the adhering member 32 can generate effective attraction to the stylus 50.

The device for detecting a fixation of a stylus according to the present disclosure includes a first support, a switch assembly, a magnet assembly and an elastic assembly. The switch assembly is arranged on the first support. The side of the magnet assembly being away from the first support is used to adhere the stylus. The switch assembly includes a micro switch. The micro switch includes a triggering button. The triggering button is arranged facing the magnet assembly. The magnet assembly includes a triggering part. The magnet assembly is movably connected with the first support. The elastic assembly is arranged at a movable joint between the magnet assembly and the first support. When the device for detecting the fixation of the stylus detects the stylus, the magnet assembly moves away from the first support under an impact of an adhesive force of the stylus, and the triggering part is not in contact with the triggering button. When the device for detecting the fixation of the stylus fails to detect the stylus, the elastic assembly causes the magnet assembly and the first support to be in a bonding state, and the triggering part is in contact with the triggering button. The device for detecting the fixation of the stylus according to the present disclosure can detect the state of the stylus reliably and effectively.

Figure 10:
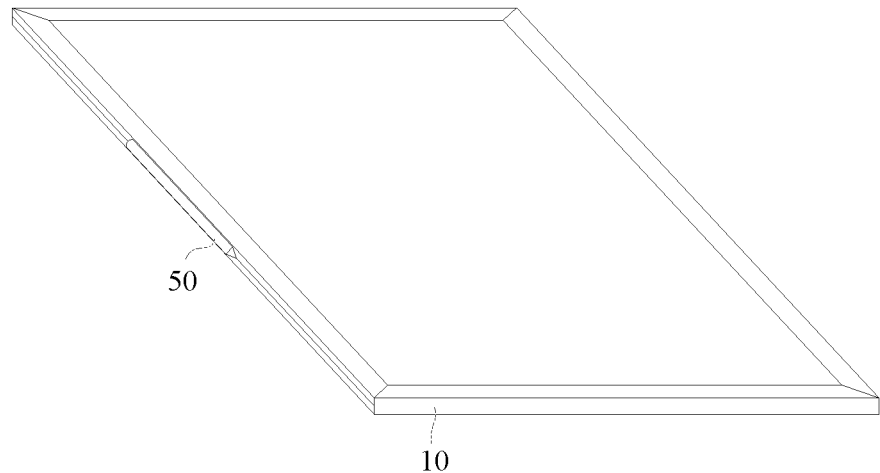
FIG. 10 is a schematic structural diagram of an intelligent interactive board according to an embodiment of the present disclosure.
Figure 11A:
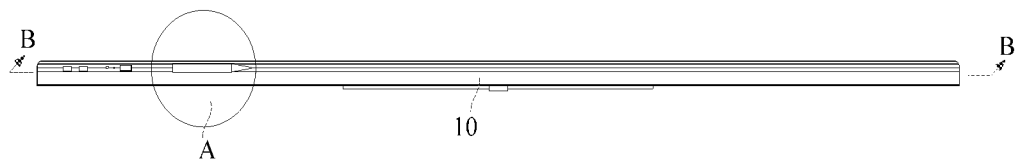
FIG. 11a is a schematic diagram of a partial structure of an intelligent interactive board according to an embodiment of the present disclosure.
Figure 11B:
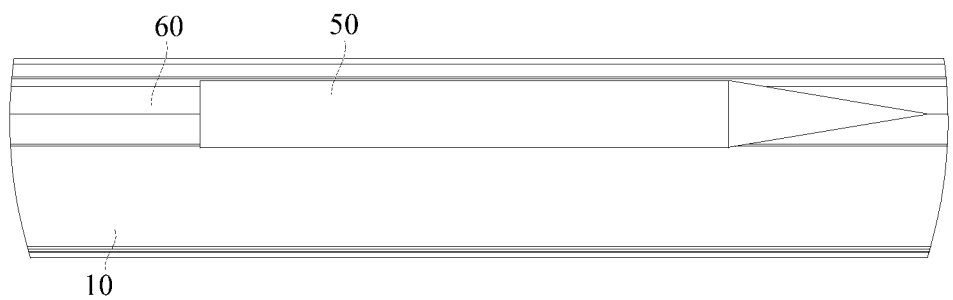
Figure 12A:
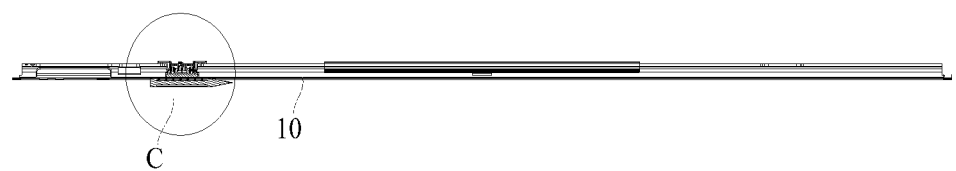
Figure 12B:
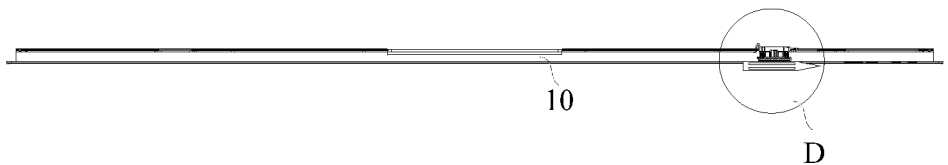
Figure 13A:
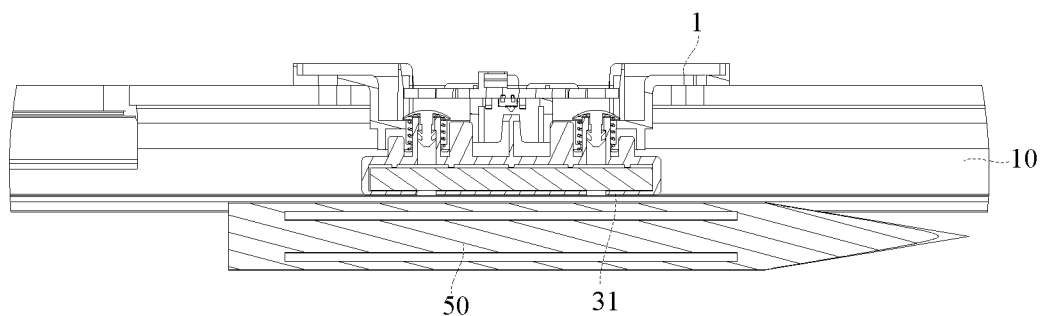
Figure 13B:
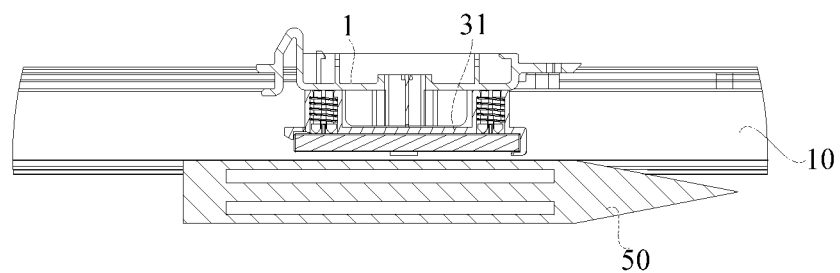
FIG. 13b is a schematic diagram of a partially enlarged structure at D in FIG. 12b.

FIG. 10 is a schematic structural diagram of an intelligent interactive board according to an embodiment of the present disclosure. FIG. 11a is a schematic diagram of a partial structure of an intelligent interactive board according to an embodiment of the present disclosure. FIG. 11b is a schematic diagram of a partially enlarged structure at A in FIG. 11a. FIG. 12a is a cross-sectional view along a B-B direction of FIG. 11a. FIG. 12b is another cross-sectional view along the B-B direction of FIG. 11a. FIG. 13a is a schematic diagram of a partially enlarged structure at C in FIG. 12a. FIG. 13b is a schematic diagram of a partially enlarged structure at D in FIG. 12b.

As shown in FIGS. 10 to 13b, according to the embodiment of the present disclosure, an intelligent interactive board is further provided, including a frame 10, a stylus 50 and the above-mentioned detection device. The device for detecting the fixation of the stylus is arranged inside the frame 10, and the first support 1 of the device for detecting the fixation of the stylus is fixedly connected with the frame 10. At least a part of the frame 10 is formed with an installing part 60, and the stylus 50 is placed on the installing part 60. The optional structure, function, and working principle of the device for detecting the fixation of the stylus have been described in detail in the above-mentioned embodiments, so details may not be repeated herein.

Alternatively, in this embodiment, the installing part 60 is a groove recessed toward the magnet assembly 3.

It may be noted that the electronic apparatus according to this embodiment further includes other assemblies or units that enable the electronic apparatus to work normally, which may not be described herein.

According to the present disclosure, an intelligent interactive board is provided, including a frame, a stylus, and the device for detecting the fixation of the stylus in the above embodiment. The device for detecting the fixation of the stylus is arranged inside the frame. The first support of the device for detecting the fixation of the stylus is fixedly connected with the frame. At least a part of the frame is formed with an installing part, and the stylus is placed on the installing part. The device for detecting the fixation of the stylus according to the present disclosure includes a first support, a switch assembly, a magnet assembly and an elastic assembly. The switch assembly is arranged on the first support. The side of the magnet assembly being away from the first support is used to adhere the stylus. The switch assembly includes a micro switch. The micro switch includes a triggering button. The triggering button is arranged facing the magnet assembly, and the magnet assembly includes a triggering part. The magnet assembly is movably connected with the first support, and the elastic assembly is arranged at a movable joint between the magnet assembly and the first support. When the device for detecting the fixation of the stylus detects the stylus, the magnet assembly moves away from the first support under an impact of an adhesive force of the stylus, and the triggering part is not in contact with the triggering button. When the device for detecting the fixation of the stylus fails to detect the stylus, the elastic assembly causes the magnet assembly and the first support to be in a bonding state, and the triggering part is in contact with the triggering button. The device for detecting the fixation of the stylus according to the present disclosure can detect the state of the stylus reliably and effectively.

What is claimed is:

1. A device for detecting a fixation of a stylus, comprising:
a first support;
a switch assembly arranged on the first support;
a magnet assembly, wherein a side of the magnet assembly being away from the first support is used to adhere the stylus; and
an elastic assembly,
wherein the switch assembly comprises a micro switch, the micro switch comprises a triggering button, the triggering button of the micro switch is arranged facing the magnet assembly, and the magnet assembly comprises a triggering part; the magnet assembly is movably connected with the first support, and the elastic assembly is arranged at a movable joint between the magnet assembly and the first support;
responsive to the device detecting the stylus, the magnet assembly moves away from the first support under an impact of an adhesive force of the stylus, and the triggering part is not in contact with the triggering button;
responsive to the device failing to detect the stylus, the elastic assembly causes the magnet assembly and the first support to be in a bonding state, and the triggering part is in contact with the triggering button.

2. The device of claim 1, wherein
the first support comprises a first support body and a first protrusion connected to the first support body, the magnet assembly comprises a second supports, and the first protrusion protrudes towards the second support;
the second support comprises a second support body and a second protrusion, the second protrusion protrudes towards the first support, and the first protrusion is movably connected to the second protrusion;

the elastic assembly comprises an elastic member, and a first end of the elastic member abuts against an end of the second protrusion, and a second end of the elastic member abuts against an end of the first protrusion; under an elastic force of the elastic member, the end of the first protrusion moves towards the second support, the end of the second protrusion moves towards the first support, and the first support and the second support approach towards each other.

3. The device of claim 2, wherein the first protrusion comprises a first through hole, and the first through hole passes through the first protrusion;
the end of the second protrusion extends to a side of the first support body being away from the second support body.

4. The device of claim 3, wherein the elastic member is sleeved on an outer wall of the second protrusion, and a gap is presented between an inner wall of the first through hole and the outer wall of the second protrusion, the elastic member is positioned in the gap between the inner wall of the first through hole and the outer wall of the second protrusion in an axial direction of the second protrusion.

5. The device of claim 3, wherein the elastic assembly further comprises a limiting member, the limiting member is arranged at the end of the second protrusion; the limiting member comprises a limiting body, a first clamping part, and a first stopping part;
the first clamping part is arranged on an end of the limiting body facing the second support, the first stopping part is arranged on an end of the limiting body being away from the second support, and a first end of the first clamping part connects with the limiting body, a second end of the first clamping part extends towards the micro switch, the second protrusion comprises a through hole communicating with the end of the second protrusion, the inner wall of the through hole comprises a stepped surface, the first clamping part extends into the through hole, and the second end of the first clamping part abuts against the stepped surface;
a length of the first supporting part in the radial direction of the second protrusion is greater than a diameter of the second protrusion, and the first end of the elastic member abuts against a side of the first stopping part facing the first clamping part.

6. The device of claim 5, wherein an end of the first protrusion comprises a second stopping part protruding inward, and the second end of the elastic member abuts against the second stopping part.

7. The device of claim 5, wherein a radial edge of the first stopping part protrudes in a direction being away from the micro switch, and a first end of the elastic member abuts against a region surrounded by the radial edge of the first stopping part.

8. The device of claim 2, wherein the second protrusion comprises a second through hole, and the second through hole passes through an end of the second protrusion facing the first support body; the first protrusion extends into the second through hole;
wherein a stepped part is disposed within the second through hole, and the elastic member abuts between an end surface of the stepped part and the end of the first protrusion.

9. The device of claim 8, wherein the first protrusion comprises at least two elastic supporting columns extending along a length direction of the first protrusion, and a gap is presented between the at least two elastic supporting columns, and an end of the at least two elastic supporting columns comprises an abutting flange, and the elastic member abuts between the end surface of the stepped part and the abutting flange.

10. The device of claim 9, wherein a side of the abutting flange facing away from the first support body comprises a chamfer; a side of the abutting flange facing the first support body comprises an abutting end surface.

11. The device of claim 9, wherein the elastic supporting column comprises a sliding section, a radial dimension of the sliding section matches an inner edge dimension of the stepped part, and a length of the sliding section in an axial direction of the first protrusion is greater than a sum of a thickness of the stepped part and a moving stroke of the second support in the axial direction.

12. The device of any one of claims 8, wherein the second protrusion comprises an installation groove, and the installation groove communicates with the second through hole, so that the elastic member enters into and exits from the second through hole through the installation groove.

13. The device of any one of claims 2, wherein the number of elastic assemblies is two, and the two elastic assemblies are distributed along a length direction of the first support at intervals.

14. The device of claim 13, wherein the number of the second protrusions is two, and the second protrusions are arranged corresponding to the elastic assemblies, the triggering part is located on the second support, the triggering part is located between the two second protrusions, the first support comprises a guiding hole, and an end of the triggering part passes through the guiding hole and abuts against the micro switch.

15. The device of any one of claims 2, wherein opposite sides of the first support body are respectively provided with a hand buckle and a clamping part, the clamping part is used to clamp with a housing of the electronic apparatus, the hand buckle is used to abut against an end of the housing of the electronic apparatus opposite to the clamping part, and at least a part of the hand buckle is exposed outside the housing of the electronic apparatus.

16. The device of any one of claims 2, wherein the magnet assembly further comprises an adhering member that is capable of magnetically adhering the stylus;
a side of the second support being away from the micro switch comprises an installing cavity, the installing cavity comprises a top cavity wall facing the micro switch and a bottom cavity wall being away from the micro switch, a length direction of the installing cavity is perpendicular to a moving direction of the magnet assembly, a lateral cavity wall of the installing cavity along the length direction comprises an opening, and the adhering member is installed in the installing cavity through the opening.

17. The device of claim 16, wherein the bottom cavity wall of the installing cavity comprises a second clamping part, and the second clamping part is used to limit the adhering member in the installing cavity.

18. The device of claim 17, wherein the switch assembly further comprises a circuit board, the circuit board is mounted on the first support, and the micro switch is connected to the circuit board.

19. The device of claim 18, wherein a side of the first support being away from the second support comprises two third clamping parts, a distribution direction of the two third clamping parts is consistent with an extension direction of the cavity bottom of the installing cavity, and the two third clamping parts are used to fix the circuit board within the first support.

20. The device of claim 19, wherein the two third clamping parts are located in the middle of the first support.

21. The device of claim 18, further comprising a plurality of positioning ribs, the plurality of positioning ribs are arranged on the first support, and the plurality of positioning ribs are distributed on both sides of the circuit board along the length direction of the first support, and ends of the positioning ribs extend away from the second support.

22. The device of claim 21, wherein a side of the positioning rib facing the circuit board comprises a guiding slope, and the guiding slope extends from a root of the positioning rib to an end of the positioning rib.

23. The device of any one of claims 2, further comprising a plurality of reinforcing ribs, the plurality of reinforcing ribs comprise a first reinforcing rib, a second reinforcing rib and a third reinforcing rib, the first reinforcing rib is arranged on the first support, the second reinforcing rib and the third reinforcing rib are arranged on the second support; the ends of both the second reinforcing rib and the third reinforcing rib extend towards the first support, the second protrusion is located between the second reinforcing rib and the third reinforcing rib, and the third reinforcing rib is located on a side of the second support close to a center of the second protrusion;

an end of the first reinforcing rib extends towards the second support, and the first reinforcing rib is located on a side of the second reinforcing rib being away from the second protrusion.

24. An intelligent interactive board, comprising:
a frame;
a stylus; and
the device of claim 1, wherein the device is arranged inside the frame, the first support of the device is fixedly connected with the frame, at least a part of the frame is formed with an installing part, and the stylus is placed on the installing part.

* * * * *